(12) United States Patent
Guillet et al.

(10) Patent No.: US 11,923,951 B2
(45) Date of Patent: Mar. 5, 2024

(54) REPEATING DEVICE AND SYSTEM FOR EXTENDING THE COVERAGE OF A WI-FI ACCESS POINT

(71) Applicant: ORANGE, Issy les Moulineaux (FR)

(72) Inventors: Valéry Guillet, Chatillon (FR); Philippe Lucas, Chatillon (FR); Rida Zouaoui, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 333 days.

(21) Appl. No.: 17/416,123

(22) PCT Filed: Dec. 17, 2019

(86) PCT No.: PCT/FR2019/053119
§ 371 (c)(1),
(2) Date: Jun. 18, 2021

(87) PCT Pub. No.: WO2020/128301
PCT Pub. Date: Jun. 25, 2020

(65) Prior Publication Data
US 2022/0077921 A1    Mar. 10, 2022

(30) Foreign Application Priority Data
Dec. 21, 2018   (FR) ...................................... 1873739

(51) Int. Cl.
*H04B 7/155* (2006.01)
*H04W 84/12* (2009.01)
*H04W 88/08* (2009.01)

(52) U.S. Cl.
CPC ......... *H04B 7/15507* (2013.01); *H04W 84/12* (2013.01); *H04W 88/085* (2013.01)

(58) Field of Classification Search
CPC . H04B 7/15507; H04W 84/12; H04W 88/085
See application file for complete search history.

(56) References Cited

U.S. PATENT DOCUMENTS

| 2008/0175212 A1 | 7/2008 | Angell et al. |
| 2008/0267142 A1 | 10/2008 | Mushkin et al. |

(Continued)

FOREIGN PATENT DOCUMENTS

| EP | 2387264 A1 | 11/2011 |
| GB | 2521187 A | 6/2015 |

(Continued)

OTHER PUBLICATIONS

English translation of the Written Opinion of the International Searching Authority dated Jul. 3, 2020 for corresponding International Application No. PCT/FR2019/053119, filed Dec. 17, 2019.

(Continued)

*Primary Examiner* — Jamal Javaid
*Assistant Examiner* — Ryan C Kavleski
(74) *Attorney, Agent, or Firm* — David D. Brush; Westman, Champlin & Koehler, P.A.

(57) ABSTRACT

A device for repeating a Wi-Fi signal transmitted by an access point and a system for extending the coverage of the Wi-Fi access point. The device for repeating the Wi-Fi signal is configured to: receive, via a wired connection connected to a device for extending a Wi-Fi access point, a digital signal resulting from the analogue-digital conversion of an analogue signal from a power division of a signal intended to be transmitted by the Wi-Fi access point around a predetermined carrier frequency so as to deliver a first Wi-Fi signal; convert the digital signal received via the wired connection into an analogue signal and transmit the analogue signal around the predetermined carrier frequency, so as to deliver a second Wi-Fi signal substantially identical to the first Wi-Fi signal.

17 Claims, 3 Drawing Sheets

(56) References Cited

U.S. PATENT DOCUMENTS

| | | | |
|---|---|---|---|
| 2011/0222434 A1* | 9/2011 | Chen .................. | H04W 52/241 370/254 |
| 2012/0044863 A1* | 2/2012 | Huang ................. | H04W 84/12 370/328 |
| 2013/0051404 A1* | 2/2013 | Binder ..................... | H04L 5/14 370/467 |
| 2016/0302096 A1* | 10/2016 | Chari ................... | H04W 40/12 |

FOREIGN PATENT DOCUMENTS

| | | |
|---|---|---|
| WO | 2004045125 A2 | 5/2004 |
| WO | 2004045125 A3 | 5/2004 |

OTHER PUBLICATIONS

International Search Report dated Apr. 1, 2020 for International Application No. PCT/FR2019/053119, filed Dec. 17, 2019.
Written Opinion of the International Searching Authority dated Apr. 1, 2020 for International Application No. PCT/FR2019/053119, filed Dec. 17, 2019.

* cited by examiner

REPEATING DEVICE AND SYSTEM FOR EXTENDING THE COVERAGE OF A WI-FI ACCESS POINT

CROSS-REFERENCE TO RELATED APPLICATIONS

This Application is a Section 371 National Stage Application of International Application No. PCT/FR2019/053119, filed Dec. 17, 2019, which is incorporated by reference in its entirety and published as WO 2020/128301 A2 on Jun. 25, 2020, not in English.

1. FIELD OF THE INVENTION

The invention relates to an equipment for increasing the Wi-Fi coverage of a Wi-Fi access point.

2. PRIOR ART

Wi-Fi coverage performance issues are one of the main complaints of residential or business (SMEs) Internet service subscribers. Such issues can result from a variety of causes, including interference or the lack of a sufficient Wi-Fi signal level received, for example when the Wi-Fi access point (typically a residential gateway) is too far away or when obstacles are present, such as thick walls or equipment interfering with the Wi-Fi signal.

In order to increase the Wi-Fi coverage of a Wi-Fi access point, it is possible to place devices called "Wi-Fi extenders" in the environment to be covered, for example in a location where the Wi-Fi signal of the access point is zero.

Such "Wi-Fi extenders" operate in a similar way to the main Wi-Fi access point of the environment. A terminal that wants to have a Wi-Fi connection must select a Wi-Fi access point from the available access points, residential gateway or "Wi-Fi extenders", and associate with this access point. However, managing multiple Wi-Fi access points to associate with is not necessarily well supported by the client terminals.

Moreover, the use of such "Wi-Fi extenders" can be tedious, as they require the implementation of complex "handover" mechanisms between two Wi-Fi access points, for example when the terminal is moved in the environment, to force the Wi-Fi terminal to select the access point providing the best Wi-Fi signal, as a Wi-Fi terminal can only communicate with one Wi-Fi access point at a given instant. These handover mechanisms are not always properly supported by the Wi-Fi client terminals.

The international application WO 2004/045125 presents a home wireless network system in which a splitting module is located between an access point and its antenna, so as to couple a part of the signal intended for the antenna (without otherwise coupling the control signals relating to this signal to be transmitted) directly to a wired extension itself connected to an extension module responsible for transmitting this part of the signal, at a distance from the access point.

However, due to the spectral characteristics of the signal it has to transmit, this system requires the specific use of a wired extension such as coaxial cable to be able to transport the radio signal as it is, by means of a transmission in analogue form of the "radio over cable" type. In particular, if the access point transmits a signal at a 5 GHz frequency, the signal transmitted over the cable will also be at that 5 GHz frequency, requiring a coaxial cable having the required bandwidth to transport such a radio signal. This system therefore requires either the presence of a pre-existing coaxial cable or the laying of a new coaxial cable to connect the extension module to the access point, which is inconvenient and can be expensive.

Moreover, this prior art system is only aimed at extending the coverage of a single-antenna access point and is difficult to transpose to a multi-antenna access point (i.e. of the MIMO type) since such a transposition would imply connecting with a dedicated coaxial cable each antenna of the multi-antenna access point to each antenna of a multi-antenna extension module.

3. SUMMARY OF THE INVENTION

The invention improves the state of the art.

It offers for this purpose a Wi-Fi signal repeating device comprising:
  means for receiving, via a wired connection connected to a device for extending a Wi-Fi access point, a digital signal resulting from the analogue-digital conversion of an analogue signal from a power division of a signal intended to be transmitted by said Wi-Fi access point around a predetermined frequency carrier so as to deliver a first Wi-Fi signal;
  digital-analogue conversion means configured to convert the digital signal received via said wired connection into an analogue signal; and
  radio retransmission means configured to transmit the analogue signal supplied by the digital-analogue conversion means around said predetermined frequency carrier, so as to deliver a second Wi-Fi signal substantially identical to the first Wi-Fi signal.

Correlatively, the invention also relates to a system for extending the coverage of a Wi-Fi access point, comprising an extension device and at least one repeating device as above, said extension device comprising analogue-digital conversion means configured to convert an analogue signal into a digital signal from a power division of a signal to be transmitted by said Wi-Fi access point around a predetermined frequency carrier so as to deliver a first Wi-Fi signal, and means for transmitting said digital signal to said at least one repeating device via a wired connection,
  said at least one repeating device being configured to transmit an analogue signal, resulting from a digital-analogue conversion of the digital signal received from the extension device, around said predetermined frequency carrier, so as to deliver a second Wi-Fi signal substantially identical to said first Wi-Fi signal.

According to the invention, a device for repeating a Wi-Fi signal and a Wi-Fi coverage extension system are proposed. Such a system comprises the device for repeating the Wi-Fi signal transmitted by a Wi-Fi access point and at least one device for extending this Wi-Fi access point, which can be comprised in this Wi-Fi access point.

These devices can extend the Wi-Fi coverage of a Wi-Fi access point without having the disadvantages of the prior art, in particular by identically repeating the Wi-Fi signal transmitted by the Wi-Fi access point, with a slight offset, without being limited to the use of a coaxial cable between the Wi-Fi access point and the extension device.

From a Wi-Fi client terminal point of view, it receives the combination of the two Wi-Fi signals: the first Wi-Fi signal transmitted by the Wi-Fi access point and the second Wi-Fi signal transmitted by the repeating device (or more if there are several repeating devices), each Wi-Fi signal having propagated over its own multipath propagation channel.

Advantageously, the repeating device is not a Wi-Fi access point. The Wi-Fi network extended with the Wi-Fi repeater is thus seen by the Wi-Fi terminals as originating from a single Wi-Fi access point. The problems due to the selection of a Wi-Fi access point or to the handover between Wi-Fi access points are thus avoided.

Moreover, the repeating device does not require a Wi-Fi encoding/decoding module because the received signal to be retransmitted is already encoded according to the Wi-Fi standard. The repeating device operates at the radio/physical layer level.

The first Wi-Fi signal transmitted by the Wi-Fi access point and the second Wi-Fi signal transmitted by the repeater are substantially identical. This means that both signals transport the same data, on the same channel, using the same frequency carrier. The same modulation scheme, for example based on an OFDM modulation, is used to transmit the signal. The two signals therefore have the same waveform. The only potential differences are a difference in power, since the tapped signal transmitted by the repeating device is from a power division of the signal to be transmitted by the Wi-Fi access point, then possibly amplified before transmission by the antenna system of the repeating device (within the regulatory ERIP (Equivalent Radiated Isotropic Power limits), as well as a slight offset, due notably to the transmission time of the tapped signal to the repeating device.

According to a particular embodiment of the invention, the receiving means of the repeating device are configured further to receive, from the extension device, a signal control of the signal intended to be transmitted by said Wi-Fi access point, obtained by the extension device from the Wi-Fi access point, the radio retransmission means of the repeating device being configured to take into account said control signal to transmit the analogue signal supplied by the digital-analogue conversion means.

In particular, this control signal can be retrieved in analogue form at the access point and then converted into digital form by the extension device before being transmitted to the repeating device via the wired connection, where it can be converted into analogue form by the digital-analogue conversion means of this repeating device.

This control signal, typically delivered by a Wi-Fi encoding/decoding circuit of the Wi-Fi access point, can in particular comprise information (channel number and bandwidth of the Wi-Fi signal, for example) used by the radio transmission means of the Wi-Fi module of the access point to transmit the first Wi-Fi signal. This control signal is then taken into account (in particular the information it contains) by the retransmission means of the repeating device to transmit the analogue signal supplied by the digital-analogue conversion means so as to deliver the second Wi-Fi signal.

The above retrieval of the control signal by the repeating device allows the latter to have information relating to the transmission characteristics of the first Wi-Fi signal and thus to better ensure the similarity of the transmission characteristics between the first and second Wi-Fi signals despite the fact that the signal tapped at the access point has undergone analogue-digital and then digital-analogue conversions before reaching the repeating device, which may result in the loss of this information.

Correlatively, according to this particular embodiment of the invention, the extension device is configured to obtain from the Wi-Fi access point (in particular from a Wi-Fi encoding/decoding circuit of this access point) the control signal of the signal intended to be transmitted by said Wi-Fi access point around said predetermined frequency carrier and to transmit said control signal to said repeating device.

According to another particular embodiment of the invention, the repeating device further comprises means for the radio reception of a third Wi-Fi signal around a predetermined frequency carrier, and means for transmitting said received third Wi-Fi signal to said extension device, via said wired connection. Correlatively, according to this other particular embodiment of the invention, the extension device of the extension system further comprises means for receiving said third signal transmitted by the repeating device via said wired connection, and the Wi-Fi module of the Wi-Fi access point comprises means for summing a fourth Wi-Fi signal received from a terminal around said predetermined frequency carrier and the third signal received from the repeating device to deliver a signal to be decoded by a Wi-Fi encoding/decoding circuit of the Wi-Fi access point.

According to this particular embodiment of the invention, when a Wi-Fi signal transmitted by a terminal around a predetermined frequency carrier is received both by the antennas of the Wi-Fi access point and by the antennas of the repeating device associated with it, the two received Wi-Fi signals are summed before being decoded by the Wi-Fi encoding/decoding circuit of the Wi-Fi access point.

According to another particular embodiment of the invention, when the repeating device is operating in receive mode, the third Wi-Fi signal received by the repeating device comprises an piece of information representative of the use of at least one transmission channel. Correlatively, in the extension system, the Wi-Fi access point is configured to use this piece of information when selecting a transmission channel to transmit a Wi-Fi signal.

According to this particular embodiment of the invention, in receive mode, the repeating device can listen to the SSIDs/RSSIs of other Wi-Fi access points of the environment and feed this information back to the Wi-Fi access point with which it is associated. For example, the repeating device receives "beacon" signals indicating that a Wi-Fi channel is used. In this way, the Wi-Fi access point with which the repeating device is associated can optimise the choice of the transmission channel for transmitting a Wi-Fi signal as it obtains channel use information from different locations of the environment, i.e. where repeating devices are placed.

According to another particular embodiment of the invention, the Wi-Fi access point comprises a plurality of antennas intended to transmit the signal around said predetermined frequency carrier and the radio retransmission means of the repeating device comprise a plurality of antennas configured to transmit the analogue signal around said predetermined frequency carrier.

This embodiment is aimed at extending the Wi-Fi coverage of a multi-antenna access point type (i.e. using for example a MIMO transmission/reception technology), for which the present invention is particularly advantageous since it allows this coverage to be extended by means of the use of a single wired transmission hardware medium (for example, a single Ethernet cable, a single fibre, etc.) between the access point and the repeating device, even though these are of the multi-antenna type.

According to another particular embodiment of the invention, the extension device obtains the analogue signal at a link between a Wi-Fi encoding/decoding component of said Wi-Fi module of said Wi-Fi access point and a radio frequency integrated circuit of the Wi-Fi access point. According to this particular embodiment of the invention, the signal to be identically retransmitted by the repeating module is obtained just after the MAC/BB Wi-Fi chipset of the Wi-Fi access point, i.e. the module for encoding/decoding the signal to be transmitted or received according to the Wi-Fi standard, before the Wi-Fi signal is supplied to the RFIC module of the Wi-Fi access point.

According to another particular embodiment of the invention, the Wi-Fi access point comprises at least one front end module, connected to at least one antenna intended for transmitting the first Wi-Fi signal, and the extension device is configured to obtain the analogue signal from the input signal of each of said at least one antenna or of each of said at least one front end module.

According to this particular embodiment of the invention, the signal to be identically retransmitted by the repeating module is obtained either at the antennas of the Wi-Fi access point or at the upstream front end module, in particular in the case of a transmission in MIMO mode, by means of several antennas. This embodiment provides the advantage that the RFIC circuit of the repeating device is standard. It does not need to be identical to the RFIC circuit of the Wi-Fi access point. The RFIC circuit can thus be simpler since it is essentially a frequency transposition module that does not require a priori knowledge of the signal formatting.

According to another particular embodiment of the invention, the first Wi-Fi signal transmitted by the Wi-Fi access point and the second Wi-Fi signal transmitted by the repeating device are transmitted according to an OFDM radio technology.

According to another particular embodiment of the invention, the repeating device and/or the extension device comprise a offset module to offset the second Wi-Fi signal compared to the first Wi-Fi signal. In this particular embodiment of the invention, the same signal is transmitted at two different locations but not at the same time, thus adding space-time diversity to the multipaths of the radio signal. Radio transmission technologies using the multipath of the radio signal, for example, OFDM, are even more powerful.

The invention also relates to a method for transmitting, by a repeating device, a Wi-Fi signal of a Wi-Fi access point, said method comprising the following steps:
  obtaining, via a wired connection connected to a device for extending a Wi-Fi access point, a digital signal resulting from the analogue-digital conversion of an analogue signal from a power division of a signal intended to be transmitted by said Wi-Fi access point around a predetermined frequency carrier so as to deliver a first Wi-Fi signal;
  converting the digital signal received via said wired connection into an analogue signal; and
  transmitting the analogue signal resulting from the conversion of the received digital signal around said predetermined frequency carrier, so as to deliver a second Wi-Fi signal substantially identical to the first Wi-Fi signal.

According to one embodiment, the method further comprises receiving, from the extension device, a control signal of the signal intended to be transmitted by said Wi-Fi access point, the transmission of the analogue signal taking into account said control signal.

According to another embodiment, the method further comprises transmitting the first Wi-Fi signal by said Wi-Fi access point, a offset being added between the second Wi-Fi signal and the first Wi-Fi signal before transmitting the analogue signal resulting from the conversion of the received digital signal.

The invention also relates to a method for receiving a Wi-Fi signal by a Wi-Fi access point via a wide area Wi-Fi network, comprising the following steps:
  radio reception around a predetermined frequency carrier, by a repeating device, of a first Wi-Fi signal,
  transmission of said received signal to an extension device of said Wi-Fi access point, via a wired connection connecting said repeating device and the extension device,
  radio reception around said predetermined frequency carrier of a second Wi-Fi signal by the Wi-Fi module of the Wi-Fi access point,
  sum of the second Wi-Fi signal received by the Wi-Fi module of the Wi-Fi access point and the first Wi-Fi signal received from the repeating device to deliver a signal to be decoded, and
  transmission of the signal to be decoded to the Wi-Fi encoding/decoding circuit of the Wi-Fi access point.

According to a particular embodiment of the invention, the first Wi-Fi signal comprises an piece of information representative of the use of at least one transmission channel.

4. LIST OF FIGURES

Other characteristics and advantages of the invention will emerge more clearly upon reading the following description of particular embodiments, provided as simple non-restrictive illustrative examples, and the annexed drawings, wherein.

DESCRIPTION OF AN EMBODIMENT OF THE INVENTION

The invention proposes a new solution for extending the Wi-Fi coverage of a Wi-Fi access point which does not have the disadvantages of the prior art.

Figure 1:
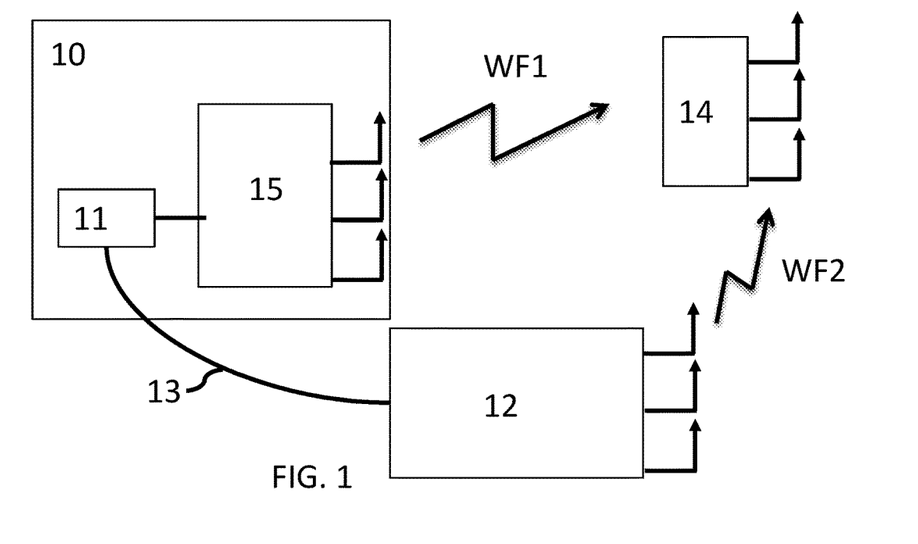
FIG. 1 illustrates a system for extending the coverage of a Wi-Fi access point according to a particular embodiment of the invention.

FIG. 1 illustrates a system for extending the coverage of a Wi-Fi access point according to a particular embodiment of the invention.

Such a system comprises a Wi-Fi access point (10), for example, a home gateway located in the home of a user subscribed to an operator, or an Internet access gateway of a company subscribed to a communication operator, comprising a Wi-Fi module 15 (Wi-Fi chipset) configured to implement the transmission and the reception of a Wi-Fi signal to and from Wi-Fi terminals associated with this access point (10). In other words, the Wi-Fi module (15) is the element of the access point (10) that implements the communication protocol at the physical layer and MAC layer according to the IEEE standard used (mainly 802.11abg/n/ac/ax/ad/ay/be).

The signals transmitted by the Wi-Fi access point (10) can use an OFDM modulation type, and in particular an OFDMA multiple access technology type, although the present invention is not limited to these types of access or modulation technology.

The access point (10) also typically comprises other modules (processor, memory, etc.) required for its operation and for the application of the other information transport layers. These conventional elements not being necessary for the understanding of the invention, they are not shown in FIG. 1.

The system illustrated in FIG. 1 also comprises an extension device (11), advantageously integrated in the Wi-Fi access point (10), but that can also be connected to it without being integrated. This extension device (11) is configured to retrieve the analogue signal intended to be transmitted by the Wi-Fi module (15) of the access point (10).

The system illustrated in FIG. 1 also comprises a repeating device (12), this repeating device being a remote radio module that identically repeats the Wi-Fi signal transmitted by the Wi-Fi access point (10).

For this purpose, the extension device (11) and the repeating device (12) are connected by a wired medium (13) such as a coaxial cable, an optical fibre or an Ethernet cable. The wired medium (13) can also be of the powerline type, i.e. an electrical cable within a home electrical network, to supply power to wall sockets.

The Wi-Fi signal retrieved by the extension device (11) is transmitted via the wired medium (13) to the repeating device (12), which repeats it identically to the Wi-Fi access point.

Thus, the system for extending the Wi-Fi coverage presented here extends the radio coverage of a Wi-Fi access point (AP) by remotely repeating, with a slight offset, the Wi-Fi signal of the Wi-Fi access point.

The principle consists in tapping a part of the power of the signal intended to be transmitted by the Wi-Fi module of the Wi-Fi access point, either in baseband or around its frequency carrier, to retransmit it further and identically using one or more remote radio modules, also referred to as repeating devices hereafter.

Identical retransmission means that the repeating device uses the same channel, the same modulation (MCS, bandwidth, number of spatial streams, etc.), the same data, but with a slight offset, as the Wi-Fi access point. The Wi-Fi access point and the repeating device thus respectively transmit a first Wi-Fi signal and a second, substantially identical, Wi-Fi signal.

The offset can be generated naturally by the processing times of the different components inserted in the extension (11) and repeating (12) devices, as well as by the travel time in the wired medium (13).

According to a particular embodiment of the invention, if the offset is too short with respect to the guard interval of the OFDM modulation used by the Wi-Fi access point, a specific delay can be added to the signal tapped by a dedicated component (delay line, for example) that can be incorporated in either of the extension and repeating devices.

This technique can be seen as a combination of spatial and temporal macro-diversity.

The Wi-Fi client station, or Wi-Fi client terminal (14 in FIG. 1), ultimately receives the combination of two (or more) radio signals WF1, WF2, each having propagated on its own multipath propagation channel: a propagation channel from the main Wi-Fi access point (10) for the radio signal WF1 and a propagation channel from the remote radio module (repeating device 12) for the radio signal WF2.

The channel information is passed to the remote module (12) in a control signal (denoted "c" in the FIGS. 2 and 3 described later).

The channel is known, or chosen by the Wi-Fi access point (10) using a conventional selection algorithm. Typically, the channel is chosen according to the power levels of the SSIDs (Service Set Identifiers) seen on the Wi-Fi access point (10) side.

According to a particular embodiment of the invention, in receive mode, the repeating device (12) can feed back the RSSI power levels of the SSIDs of the environment to the Wi-Fi access point (10). Thus, the Wi-Fi access point (10) can take this information into account to select a transmission channel when it wants to transmit a Wi-Fi signal. For example, in the list of SSID power levels used by the Wi-Fi access point (10), there will also be the power levels of the SSIDs seen on the repeating device (12) side.

The principle in the case where a single repeating device is added is described below, although the system can of course be generalised to several remote repeating devices. In this case, each repeating device will need to be wired to the Wi-Fi access point to obtain the Wi-Fi signal to be retransmitted.

If the frequency response of the signal transmitted by the Wi-Fi access point (10) in baseband is denoted S(F), the terminal (14) receives a signal composed of the useful signal and noise, the useful signal corresponding to the product $S(F-F0) \times (H1(F-F0)+H2(F-F0))$, where $H1(F-F0)$ and $H2(F-F0)$ designate respectively the transfer functions of the multipath radio channel between the Wi-Fi access point (10) and the client terminal (14) and between the repeating device (12) and the client terminal (14) around the same frequency carrier F0.

According to the prior art, with a conventional Wi-Fi extender, i.e. operating as a Wi-Fi access point, a terminal receives a signal composed of a useful signal and noise, in which the useful signal corresponds to the product $S1(F-F0) \times H1(F-F0)$ or $S'2(F-F1) \times H2(F-F1)$, where S1 corresponds to the frequency response of the signal transmitted by the main Wi-Fi access point and S'2 corresponds to the frequency response of the signal transmitted by the conventional Wi-Fi extender, and S1 and S'2 can be different, as well as the carrier frequencies F0 and F1 of the main Wi-Fi access point and the conventional Wi-Fi extender respectively, which can also be different.

According to the prior art, this is in particular what can lead to a degradation in performance, for example when the Wi-Fi terminal remains on the 1st main Wi-Fi access point using the received signal $S1 \times H1$ while the signal $S'2 \times H2$ transmitted by the conventional Wi-Fi extender could offer a better bit rate. However, this is very difficult to anticipate when the Wi-Fi access points and the Wi-Fi extenders operate in MIMO (Multiple Input Multiple Output). Indeed, with such an operation, a better signal level does not necessarily ensure a better bit rate.

According to the invention, the system described in relation to FIG. 1 can be extended by adding several remote radio modules or repeating devices (12) depending on the size of the residence concerned. Moreover, remote radio modules (12) can be added for each frequency band (2.4 GHz, 5 GHz, 60 GHz . . . ) and technology deemed useful (4G, 5G . . . ). It is sufficient that all the repeating devices and the Wi-Fi access point use the same radio transmission technique, for example, OFDM (Orthogonal Frequency-Division Multiplexing).

The system according to the invention also operates in the upstream direction, i.e. the signals received by the Wi-Fi access point (10) on the one hand and by the remote radio module(s) (12) on the other hand are summed before decoding by the Wi-Fi chipset (15) of the Wi-Fi access point (10). The upstream and downstream directions are separated by a standard system of duplexers.

The principle for extending the Wi-Fi radio coverage described significantly improves the Wi-Fi radio coverage of the access point in terms of bit rate and range.

The Wi-Fi network, established by the access point and the repeating device(s) according to the invention associated with it, is seen by the Wi-Fi terminals as coming from a single access point. This eliminates handover or "client steering" (technology that forces the Wi-Fi terminal to associate with an AP other than the one selected by default by its own Wi-Fi connection manager) issues between the main Wi-Fi access point and the conventional Wi-Fi extenders. Unlike prior art solutions using a wired/Wi-Fi or Wi-Fi/Wi-Fi conventional Wi-Fi extender, with the invention, the terminal does not have to choose which Wi-Fi access point to associate with because it only sees one Wi-Fi access point.

The initial pairing is also made easier. Indeed, there is no change to the live pairing mechanism with a Wi-Fi access point, except that the Wi-Fi client terminal will be able to pair while being placed further away. The same security key is kept.

The principle for extending the Wi-Fi radio coverage according to the invention also allows for spectrum saving by using the same channel in any covered location with such a coverage extension system.

The choice of the Wi-Fi channel is thus optimised, a Wi-Fi access point selecting according to the prior art a channel by using the signal levels of the detected neighbouring Wi-Fi access points. According to a particular embodiment of the invention, the Wi-Fi access point will also have access to the signal levels of other neighbouring Wi-Fi access points of the repeating device(s).

According to the invention, the Wi-Fi access point can keep its algorithm by using the SSID/RSSI (Received Signal Strength Indication) data seen on the Wi-Fi access point side as well as on the repeating device(s) side. The channel chosen is then preferably the one that is the best channel over the coverage areas of the access point and of the repeating device(s) associated with it, and no longer the best channel over the area limited to the coverage of the Wi-Fi access point or of the conventional Wi-Fi extender.

The channel choice is then more "optimal" than with the prior art solutions in that interference information at several different locations in the residence is used in the channel choice, and not just locally at a single location where the main Wi-Fi access point is placed.

Figure 2:
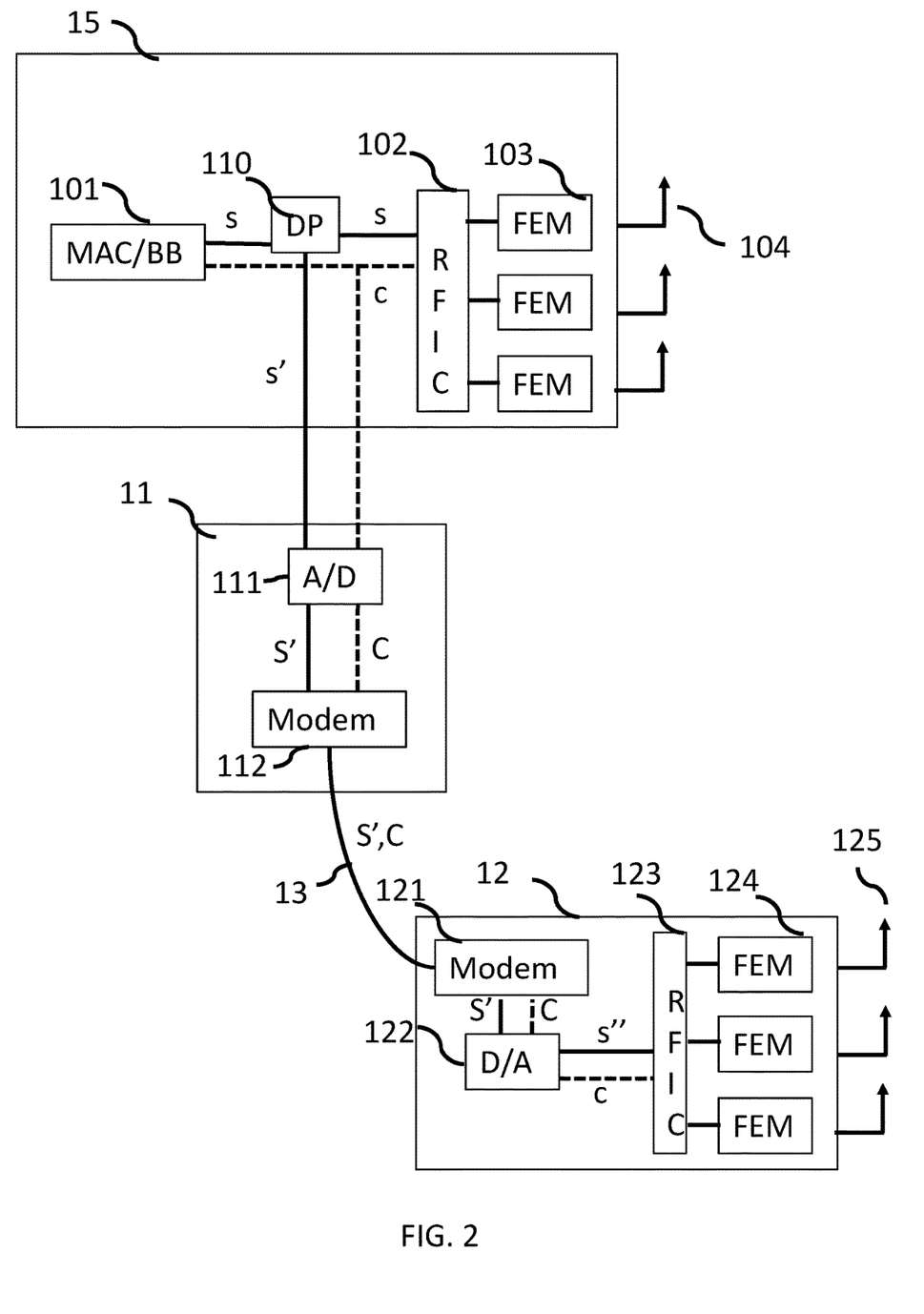
FIG. 2 illustrates an arrangement of the elements of a system for extending the coverage of a Wi-Fi access point according to a particular embodiment of the invention.

FIG. 2 illustrates an arrangement of the elements of a system for extending the coverage of a Wi-Fi access point according to a particular embodiment of the invention.

In FIG. 2, only those elements of the Wi-Fi access point (10) that are necessary for the invention have been shown. The Wi-Fi module (15) is shown here using an example of a 3×3 MIMO transmission, however the principle of the invention extends to other types of MIMO transmission.

Classically, the Wi-Fi module (15) comprises a Wi-Fi encoding/decoding (MAC/BB) module (101), a radio frequency (RFIC) circuit (102) and 3 FEM (Front End Module) modules (103) comprising in particular a signal amplifier, a low-noise amplifier (LNA) and a duplexer for separating the upstream and downstream directions of the channel. The Wi-Fi module (15) shown in FIG. 2 also comprises three antennas (104), connected to the three FEM modules respectively.

According to the invention, the extension device (11) comprises an analogue-digital (A/D) converter (111) and a modulator-demodulator (112, modem) for adapting the signal to be transmitted to the wired medium used.

According to the particular embodiment described here, the extension device (11) obtains an analogue signal (denoted "s" in FIG. 2) tapped from a signal (denoted "s" in FIG. 2 and shown in solid line) to be transmitted by the Wi-Fi module (15). This signal s' is typically obtained at the link between the Wi-Fi encoding/decoding module (101) and the RFIC circuit (102). The signal s is the I/Q channel baseband OFDM signal from the MAC/BB encoder/decoder.

The tapping of a part of the signal is performed by adding a power divider (110) between the MAC/BB and RFIC link and the A/D converter (111) of the extension device. Tapping is understood here as tapping a small percentage of the power of the signal s. Such a tapping is therefore done by dividing the power of the signal s to deliver the signal s'.

The extension device (11) also retrieves the control signal (denoted "c" in FIG. 2) intended to control the transmission of the signal s by the Wi-Fi module (15), by providing information to the radio frequency (RFIC) circuit (102) and the FEM modules (103), such as the channel number and the bandwidth of the Wi-Fi signal. This control signal c is also typically in analogue form, for example as 0V or 5V TTL signals.

The signals s' and c are converted by the converter (111) into digital signals S' and C, which are transmitted via the modem (112) and the wired link (13) to the repeating device (12). This can be used to adapt to the bandwidth constraints of the medium used to transmit the signal s' in analogue form, and therefore to any limitations on the type of wired link to be used to respect such a constraint. In addition, converting both the "useful" signal s' and the control signal c into digital signals S' and C makes it possible to transmit these two digital signals together on the wired link (13), or even to possibly apply any appropriate digital processing to them in order to optimise this transmission.

According to the invention, the repeating device (12) comprises a modulator-demodulator (121, also called "modem") connected to digital-analogue conversion means (122) which are themselves connected to radio retransmission means. In particular, the digital-analogue conversion means (123) can be implemented as a digital-analogue (D/A) converter. The retransmission means can be implemented in the form of an RFIC radio frequency circuit (123) connected to N (here N=3 as an example) FEM (Front End Module) modules (124) each connected to N antennas (125).

The repeating device (12) therefore receives the digital signals S' and C via the wired link (13), the modulator-demodulator (121) demodulates these two signals S' and C, and then supplies them to the converter (122), which converts them into analogue signals s" and c' respectively. The analogue signals s" and c' are then transmitted to the RFIC circuit (123) in order to transmit the analogue signal s" identically to the signal s, but with a slight offset compared to the first Wi-Fi signal s transmitted by the Wi-Fi module (15). Possibly, the signal s" is amplified before transmission by the antenna system of the repeating device, within the regulatory ERIP limits.

To transmit the analogue signal s", the RFIC circuit (123) uses the control signal "c" received from the Wi-Fi access point, and in particular the channel and modulation information it can contain.

According to the particular embodiment described here, the RFIC circuit (123) is advantageously identical to the RFIC circuit (102) of the Wi-Fi module (15), so that the analogue signal s" is distributed to the FEM modules (124) and the antennas (125) of the repeating device (12) in the same way as the signal s is distributed to the FEM modules (103) and the antennas (104) of the Wi-Fi module (15).

Figure 3:
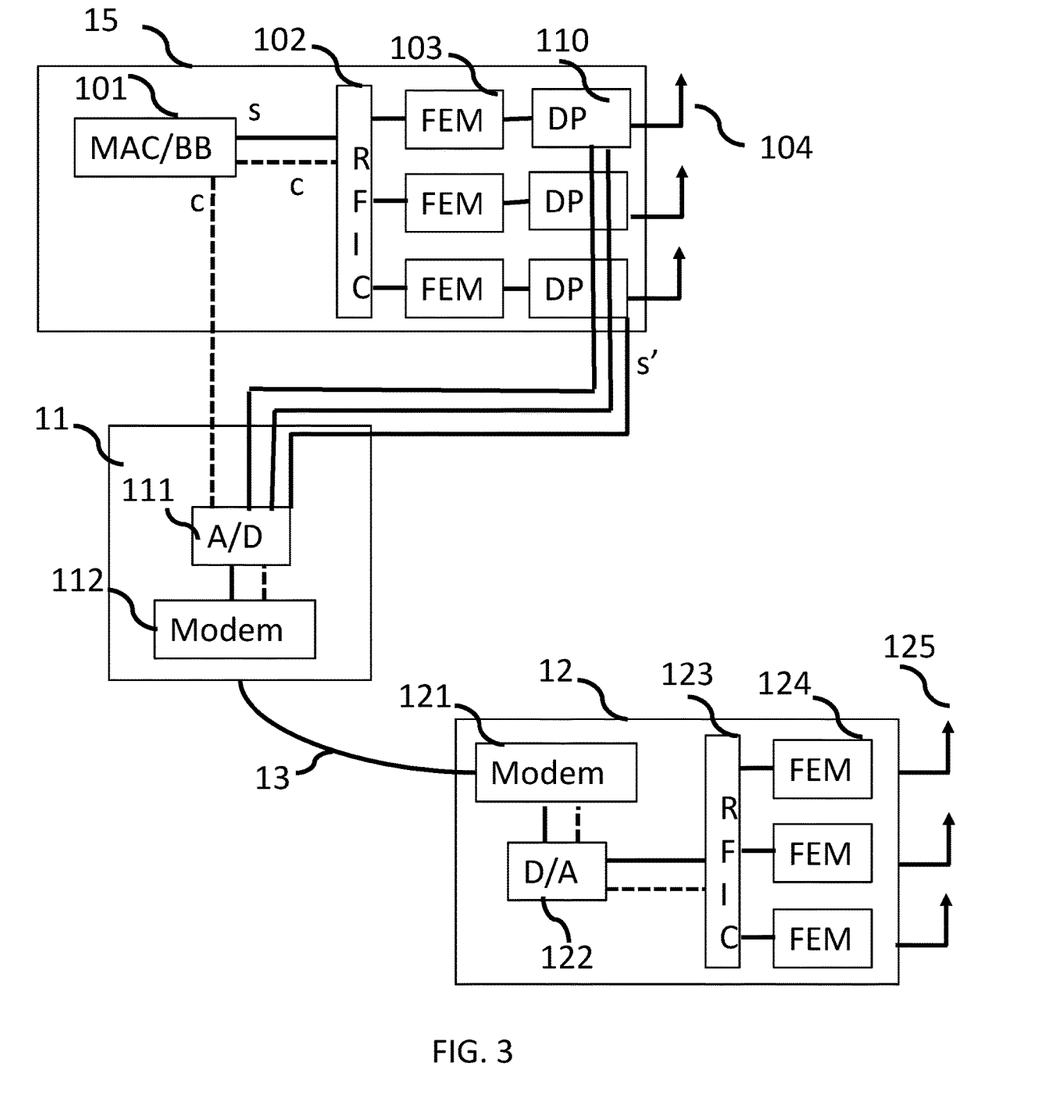
FIG. 3 illustrates an arrangement of the elements of a system for extending the coverage of a Wi-Fi access point according to another particular embodiment of the invention.

FIG. 3 illustrates an arrangement of the elements of a system for extending the coverage of a Wi-Fi access point according to another particular embodiment of the invention. The elements in FIG. 3 are almost identical to those shown in relation to the figure. Only the tapping point of the signal s' is different.

According to this particular embodiment of the invention, the signal s' is tapped by the extension device (11) at the link between each FEM module (103) and each antenna (104). Alternatively, the signal s' can also be tapped by the extension device (11) at the link between the RFIC circuit (102) and each FEM module (103).

The control signal "c" is tapped at the Wi-Fi (MAC/BB) encoding/decoding module (101).

The tapping of a part of the signal s to deliver the tapped signal s' is performed by adding a power divider (110) between each antenna (104) and its corresponding FEM module (103), or between the RFIC circuit (102) and each FEM module (103), so as to provide the tapped signal s' to the A/D converter (111) of the extension device.

According to this particular embodiment of the invention, the signals are tapped before or after the FEM modules (depending on the connectors). A very small part of the emitted power is required. Indeed, A/D converters do not need the 23 to 30 dBm emitted (0 dBm or even less can suffice, i.e. less than ¹⁄₁₀₀₀ of the emitted power can suffice). The RFIC circuit (123) of the repeating device (12) is more standard here than the one of the particular embodiment described in relation to FIG. 2 in which the signal is tapped at baseband. Indeed, according to the particular embodiment described in relation to FIG. 3, the RFIC circuit (123) is essentially a frequency transposition module which does not require knowledge of signal formatting.

The signal s' tapped at the antennas or the FEMs here has 3 dimensions (in the case of a 3×3 MIMO) that can be put in series at the A/D converter or the modem. This serialisation is the purpose of the CPRI protocol or any other protocol allowing the transmission of the signal s' to the repeating device. According to this particular embodiment of the invention, the format/matching with the antennas is known here.

The general principle of the invention has been described here for a signal to be transmitted by the Wi-Fi module of an access point, i.e. in the downstream direction. The elements described in relation to FIGS. 2 and 3 operate in a reciprocal manner in the upstream direction (reception of a Wi-Fi signal by the antennas (104 and 125)).

The separation of the radio signals between upstream and downstream directions requires duplexers, usually this function is integrated in the "FEM" modules. Similarly, the RFIC circuits must also be able to operate in both directions (frequency transposition to the desired frequency in the downstream direction, transposition to the baseband for the upstream direction).

The A/D converters and modem must also operate in both directions, not simultaneously, since the Wi-Fi cannot receive and transmit at the same time.

In the upstream direction, the signals received by the Wi-Fi module (15) of the access point and by the remote radio module(s) (repeating device 12) are summed at the Wi-Fi module (15).

More precisely, for example in the case of the embodiment described in relation to FIG. 3, the received signals are summed at the antenna or FEM module connectors.

In the case of the embodiment described in relation to FIG. 2, the received signals are summed at the MAC/BB—RFIC link.

In the downstream direction, as explained above, the signal is tapped by a power divider. In the upstream direction, the signals are summed by a power coupler.

According to different embodiment, the same component can perform both functions (splitter/coupler).

In the case where the signal is tapped at the antenna or FEM, it is preferable to have one splitter/coupler per antenna or FEM connector.

According to a particular embodiment of the invention, a time delay can be added to the signal s' compared to the signal s or to the signal s compared to the signal s'. For example, this can be done using a dedicated delay line type component, not shown in FIG. 2 or 3.

Thus, a offset is added to the second Wi-Fi signal transmitted by the repeating device compared to the first Wi-Fi signal transmitted by the Wi-Fi access point, or vice versa, depending on the chosen implementation variant. Such a delay can be added both in transmission and in reception.

The Wi-Fi standard defines several interval values known as guard intervals depending on the standard used: for example, in 802.11n/ac, 2 values are possible: 400 ns or 800 ns.

This interval is chosen so as to absorb the multipath related delays of the propagation channel and to optimise the OFDM performance. In particular, the more multipaths there are (with the delays distributed within the guard interval limits), the better the OFDM performance will be. In other words, a better bit rate is achieved for the same received power levels.

For example, in the case of a Wi-Fi access point implemented by a home gateway, therefore for Wi-Fi communications inside a home, based on a guard interval of 400 ns according to the 802.11n/ac standard, the delay to be added can be 100 ns for example, without the risk of exceeding the tolerance of the system to multipaths.

Different embodiment variants are possible to add this delay, depending on the performance of the electronic components added for the implementation of the invention.

According to a first variant, if the processing times T (ns) of the extension module and the power division are very fast (for example, <100 ns), then the additional delay (100−T) is added at the repeating devices.

According to a second variant, if the processing times of the extension module and the power division are "relatively high" (for example, of the order of a few microseconds denoted x), in this case, the delay is added at the Wi-Fi access point when the signal is tapped on the channel of the signal s intended to be transmitted by the Wi-Fi access point. This delay is then x microseconds−100 ns to have a offset of 100 ns between the first Wi-Fi signal transmitted by the Wi-Fi access point and the second Wi-Fi signal transmitted by the repeating device.

Figure 4:
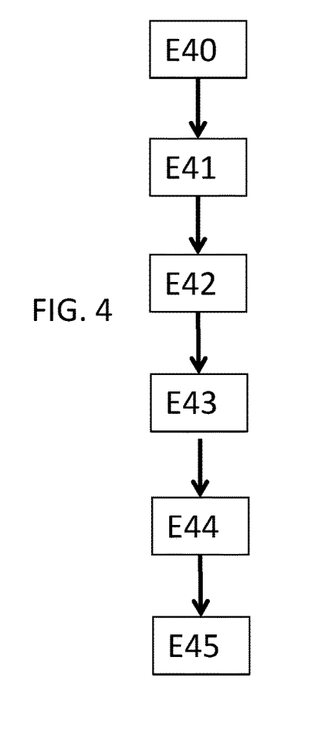
FIG. 4 illustrates steps of a method for transmitting a Wi-Fi signal of a Wi-Fi access point according to a particular embodiment of the invention.

FIG. 4 illustrates steps of a method for transmitting, by a repeating device, a Wi-Fi signal of a Wi-Fi access point according to a particular embodiment of the invention.

In a step E40, a first Wi-Fi signal is transmitted by the Wi-Fi access point (10) from an analogue signal s, around a predetermined frequency carrier. The predetermined frequency carrier corresponds, for example, to a frequency associated with a transmission channel selected by the Wi-Fi access point.

In a step E41, the extension device (11) of the Wi-Fi access point (10) obtains an analogue signal s' corresponding to a part of the signal s transmitted in step E40, as well as possibly a control signal c intended to control the transmission of the signal s by the Wi-Fi access point, from a Wi-Fi module (15) of the Wi-Fi access point. The obtaining step E41 can be implemented after step E40 or simultaneously with step E40.

In a step E42, the extension device (11) converts the analogue signal s' obtained in step E41 into a digital signal S'. It can also convert the control signal c, if it obtained it in step E41, into a control digital signal C during the same step.

In a step E43, the extension device (11) transmits the digital signal S' (and possibly the control digital signal C) to the repeating device (12) connected to the extension device via a wired connection (13).

In a step E44, after receiving the digital signal S', the repeating device (12) converts this digital signal S' into an analogue signal s'' which it is intended to transmit. It can also convert the control digital signal C, if it obtained it in step E43, into a control analogue signal at this point.

In a step E45, the repeating device (12) transmits by radio wave around the predetermined frequency carrier the analogue signal s'' resulting from the conversion performed in step E42'. This radio signal transmission is done in a substantially identical way to the Wi-Fi signal transmission performed by the Wi-Fi module (15) of the Wi-Fi access point. In other words, the same frequency carrier is used, and therefore the same channel, as well as the same modulation.

Figure 5:
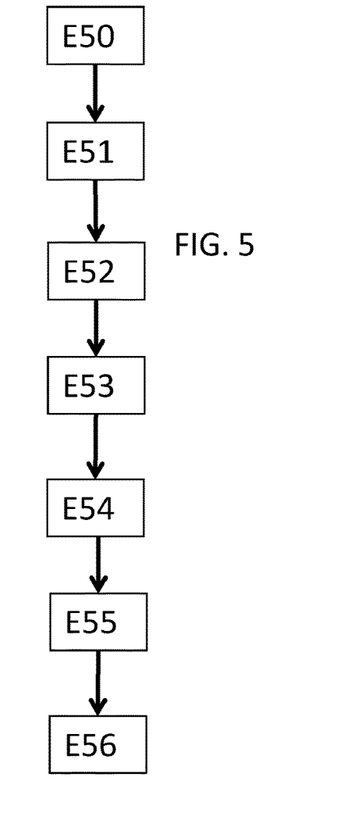
FIG. 5 illustrates steps of a method for receiving a Wi-Fi signal of a Wi-Fi access point according to a particular embodiment of the invention.

FIG. 5 illustrates steps of a method for receiving a Wi-Fi signal of a Wi-Fi access point according to a particular embodiment of the invention.

In a step E50, the repeating device (12) receives via its radio antennas, around a predetermined frequency carrier, a Wi-Fi signal. Such a Wi-Fi signal may have been transmitted by a terminal communicating with the Wi-Fi access point, or by another Wi-Fi access point. For example, in this case, the Wi-Fi signal corresponds to a "beacon" frame from a Wi-Fi access point comprising an SSID piece of information of the Wi-Fi access point, associated with an RSSI level of a channel used by the Wi-Fi access point. Such information thus corresponds to an piece of information about the use of a transmission channel.

In a step E51, the repeating device (12) converts the received analogue signal into a digital signal and transmits this digital signal to the extension device (11) of the Wi-Fi access point, via the wired connection (13) connecting the repeating device and the extension device (step E52).

In a step E53, the extension device converts the digital signal from the repeating device into an analogue signal which it then provides to the Wi-Fi module (15) of the Wi-Fi access point.

In a step E54, the Wi-Fi module (15) possibly receives a Wi-Fi signal around the same predetermined frequency carrier, via the antennas 104 of the Wi-Fi module (15). This Wi-Fi signal can originate from a terminal or another Wi-Fi access point.

In a step E55, the signal received by the Wi-Fi module (15) of the Wi-Fi access point and the signal provided by the extension device (11) from the repeating device (12) are summed in the Wi-Fi access point to deliver a Wi-Fi signal to be decoded.

In a step E56, the Wi-Fi signal to be decoded is transmitted to the Wi-Fi encoding/decoding circuit (101) of the Wi-Fi access point.

According to a particular embodiment of the invention, the decoded Wi-Fi signal is a "beacon" frame of another Wi-Fi access point. It thus comprises an piece of information representative of the use by that other Wi-Fi access point of a transmission channel associated with said predetermined frequency carrier. Such an piece of information is then fed back to a software module of the Wi-Fi access point implementing the channel selection algorithm for data transmission. The channel selection algorithm implemented by the Wi-Fi access point is thus optimised as it benefits from the channel use information available at the remote repeating devices that are associated with it.

The methods for transmitting and receiving a Wi-Fi signal, in an extended Wi-Fi network via the system for extending the Wi-Fi coverage described above, add time diversity to the channel by adding offset to the transmission time of the remote access points and radio modules. Such a diversity is beneficial to the OFDM performance as long as the delay between the transmissions remains within the guard interval limits of the system.

Moreover, the Wi-Fi coverage is extended at a purely radio level, so there are no software upgrade constraints.

In order to connect the extension device to the Wi-Fi module of the Wi-Fi access point, appropriate connectors are required to tap the signal to be repeated, as well as the sync signals/commands (signal "c" in FIGS. 2 and 3).

Depending on the embodiment considered, this may be complicated to achieve in the context of an increasing integration of the radio functions and the disappearance of connectors on new Wi-Fi chipsets, in particular for the embodiment based on baseband signal tapping (FIG. 2). This is why, for this particular embodiment, a collaboration between the chipset manufacturer and the industrial/integrator will be required to have the appropriate connectors.

A protocol (proprietary or not) can be necessary to transmit the repeated signal remotely on a wired medium type (coaxial, fibre, Ethernet, etc.), in particular so as not to limit the Wi-Fi performance (2.5G bidirectional Ethernet likely for the 802.11ax future generation). Protocols from the mobile domain can easily be used or adapted, such as the CPRI (Common Public Radio Interface) protocol, which links the baseband unit (BBU) and the remote radio head (RRH) of mobile base stations, or the IEEE P1904.3 protocol used to transmit radio signals over Ethernet.

It should also be noted that the signals of the access point are repeated identically and therefore in particular all the transmitted SSIDs. To avoid this, a filtering of the desired SSIDs can be added at the Wi-Fi chipset of the access point.

As with a conventional Wi-Fi extender, rules for positioning the remote radio modules must be respected to avoid disrupting the main access point, especially where the initial coverage of the access point was satisfactory.

When there are several Wi-Fi access points operating with different technologies, or if one access point is able to operate according to different Wi-Fi technologies (Wi-Fi 2.4 GHz, Wi-Fi 5 GHz, Wi-Fi 60 GHz), or 3GPP (4G, 5G . . . ), it is advantageous to add a remote radio module (and therefore also a corresponding extension device) for each technology (Wi-Fi 2.4 GHz, Wi-Fi 5 GHz, Wi-Fi 60 GHz, 4G, 5 G . . . ) for which the coverage should be extended. Indeed, the electronic components and the antennas are not necessarily the same depending on the technologies and frequency bands.

The invention claimed is:
1. A Wi-Fi signal repeating device comprising:
    a first receiver configured to receive, via a wired connection connectable to an extension device for extending a Wi-Fi access point, a digital signal resulting from an analogue-digital conversion of an analogue signal from a power division of a signal intended to be transmitted by said Wi-Fi access point around a first predetermined frequency carrier so as to deliver a first Wi-Fi signal;

a digital-analogue converter configured to convert the digital signal received via said wired connection into an analogue signal;

a radio retransmitter configured to transmit the analogue signal supplied by the digital-analogue converter around said first predetermined frequency carrier, so as to deliver a second Wi-Fi signal substantially identical to the first Wi-Fi signal;

a second, radio receiver configured to receive a third Wi-Fi signal, around a second predetermined frequency carrier; and a transmitter configured to transmit said received third Wi-Fi signal to said extension device via said wired connection to be summed with a fourth Wi-Fi signal, received by said Wi-Fi access point from a terminal around said second predetermined frequency carrier so as to deliver a signal to be decoded by a Wi-Fi encoding/decoding circuit of the Wi-Fi access point.

2. The Wi-Fi signal repeating device according to claim 1, wherein:
the first receiver is configured to further receive, from the extension device, a control signal of the signal intended to be transmitted by said Wi-Fi access point, obtained by the extension device from the Wi-Fi access point;
said radio retransmitter being configured to take into account said control signal to transmit the analogue signal.

3. The Wi-Fi signal repeating device according to claim 1, wherein said third Wi-Fi signal comprises a piece of information representative of use of at least one transmission channel.

4. The Wi-Fi signal repeating device according to claim 1, wherein the retransmitter comprises a plurality of antennas configured to transmit the analogue signal around said first predetermined frequency carrier.

5. The Wi-Fi signal repeating device according to claim 1, wherein said first and second predetermined frequency carriers are the same predetermined frequency carrier.

6. An extension system for extending coverage of a Wi-Fi access point, comprising:
an extension device; and
at least one repeating device, which comprises:
a first receiver configured to receive, via a wired connection connectable to the extension device for extending the Wi-Fi access point, a digital signal resulting from an analogue-digital conversion of an analogue signal from a power division of a signal intended to be transmitted by said Wi-Fi access point around a first predetermined frequency carrier so as to deliver a first Wi-Fi signal;
a digital-analogue converter configured to convert the digital signal received via said wired connection into an analogue signal;
a radio retransmitter configured to transmit the analogue signal supplied by the digital-analogue converter around said first predetermined frequency carrier, so as to deliver a second Wi-Fi signal substantially identical to the first Wi-Fi signal;
a second, radio receiver configured to receive a third Wi-Fi signal, around a second predetermined frequency carrier; and
a transmitter configured to transmit said received third Wi-Fi signal to said extension device via said wired connection to be summed with a fourth Wi-Fi signal, received by said Wi-Fi access point from a terminal around said second predetermined frequency carrier so as to deliver a signal to be decoded by a Wi-Fi encoding/decoding circuit of the Wi-Fi access point
said extension device comprising:
an analogue-digital converter configured to convert into the digital signal the analogue signal from the power division of the signal to be transmitted by said Wi-Fi access point around the predetermined frequency carrier so as to deliver the first Wi-Fi signal; and
a transmitter configured to transmit said digital signal to said at least one repeating device via the wired connection.

7. The extension system according to claim 6, wherein the extension device is further configured to:
obtain from the Wi-Fi access point a control signal of the signal to be transmitted by said Wi-Fi access point around said first predetermined frequency carrier; and
transmit said control signal to said repeating device.

8. The extension system according to claim 6, wherein:
the third Wi-Fi signal received from the repeating device comprises a piece of information representative of use of at least one transmission channel; and
said Wi-Fi access point is configured to use said piece of information when selecting a transmission channel to transmit a Wi-Fi signal.

9. The extension system according to claim 6, wherein the extension device obtains the analogue signal to be converted to the digital signal:
at a link between a Wi-Fi encoding/decoding component a Wi-Fi module of said Wi-Fi access point and a radio frequency integrated circuit; or
when the Wi-Fi access point comprises at least one front end module connected to at least one antenna to transmit the first Wi-Fi signal, from an input signal of each of said at least one antenna or of each of said at least one front end module.

10. The extension system according to claim 6, wherein the first Wi-Fi signal transmitted by the Wi-Fi access point and the second Wi-Fi signal transmitted by the repeating device are transmitted according to an OFDM radio technology type.

11. The extension system according to claim 6, wherein the repeating device and/or the extension device comprise an offset module to offset the second Wi-Fi signal compared to the first Wi-Fi signal.

12. A transmission method comprising:
obtaining by a repeating device, via a wired connection connected to a device for extending a Wi-Fi access point, a digital signal resulting from an analogue-digital conversion of an analogue signal from a power division of a signal to be transmitted by said Wi-Fi access point around a predetermined frequency carrier so as to deliver a first Wi-Fi signal;
converting by the repeating device the digital signal received via said wired connection into an analogue signal;
transmitting by the repeating device the analogue signal resulting from the conversion of the received digital signal around said predetermined frequency carrier, so as to deliver a second Wi-Fi signal substantially identical to the first Wi-Fi signal; and
transmitting the first Wi-Fi signal by said Wi-Fi access point, an offset being added between the second Wi-Fi signal and the first Wi-Fi signal before transmitting the analogue signal resulting from the conversion of the received digital signal.

13. The transmission method according to claim 12, further comprising receiving, from the extension device, a control signal of the signal to be transmitted by said Wi-Fi access point, the transmission of the analogue signal resulting from the conversion of the received digital signal taking into account said control signal.

14. An extension system for extending the coverage of a Wi-Fi access point, comprising:
an extension device; and
at least one repeating device, which comprises:
a first receiver configured to receive, via a wired connection connectable to the extension device for extending the Wi-Fi access point, a digital signal resulting from an analogue-digital conversion of an analogue signal from a power division of a signal intended to be transmitted by said Wi-Fi access point around a first predetermined frequency carrier so as to deliver a first Wi-Fi signal;
a digital-analogue converter configured to convert the digital signal received via said wired connection into an analogue signal; and
a radio retransmitter configured to transmit the analogue signal supplied by the digital-analogue converter around said first predetermined frequency carrier, so as to deliver a second Wi-Fi signal substantially identical to the first Wi-Fi signal;
said extension device comprising:
an analogue-digital converter configured to convert into the digital signal the analogue signal from the power division of the signal to be transmitted by said Wi-Fi access point around the first predetermined frequency carrier so as to deliver the first Wi-Fi signal; and
a transmitter configured to transmit said digital signal to said at least one repeating device via the wired connection;
wherein the at least one repeating device and/or the extension device comprises an offset module to offset the second Wi-Fi signal compared to the first Wi-Fi signal.

15. A transmission method comprising:
obtaining by a repeating device, via a wired connection connected to a device for extending a Wi-Fi access point, a digital signal resulting from an analogue-digital conversion of an analogue signal from a power division of a signal to be transmitted by said Wi-Fi access point around a predetermined frequency carrier so as to deliver a first Wi-Fi signal;
converting by the repeating device the digital signal received via said wired connection into an analogue signal;
transmitting by the repeating device the analogue signal resulting from the conversion of the received digital signal around said predetermined frequency carrier, so as to deliver a second Wi-Fi signal substantially identical to the first Wi-Fi signal;
receiving by the repeating device a third Wi-Fi signal, around a second predetermined frequency carrier; and
transmitting by the repeating device said received third Wi-Fi signal to said extension device, via said wired connection to be summed with a fourth Wi-Fi signal, received by said Wi-Fi access point from a terminal around said second predetermined frequency carrier so as to deliver a signal to be decoded by a Wi-Fi encoding/decoding circuit of the Wi-Fi access point.

16. The transmission method according to claim 15, wherein said first and second predetermined frequency carriers are the same predetermined frequency carrier.

17. A Wi-Fi signal repeating device comprising:
a receiver configured to receive, via a wired connection connectable to an extension device for extending a Wi-Fi access point, a digital signal resulting from an analogue-digital conversion of an analogue signal from a power division of a signal intended to be transmitted by said Wi-Fi access point around a predetermined frequency carrier so as to deliver a first Wi-Fi signal;
a digital-analogue converter configured to convert the digital signal received via said wired connection into an analogue signal;
a radio retransmitter configured to transmit the analogue signal supplied by the digital-analogue converter around said predetermined frequency carrier, so as to deliver a second Wi-Fi signal substantially identical to the first Wi-Fi signal; and
an offset module to offset the second Wi-Fi signal compared to the first Wi-Fi signal.

* * * * *